United States Patent [19]

Jones

[11] 4,354,707
[45] Oct. 19, 1982

[54] PICK-UP CAMPER LOCATING AND HOLDDOWN ASSEMBLY

[76] Inventor: Edward A. Jones, 7128 Edmond St., Burnaby, British Columbia, Canada, V3N 1A5

[21] Appl. No.: 201,518

[22] Filed: Oct. 27, 1980

[51] Int. Cl.³ .............................................. B60P 3/32
[52] U.S. Cl. .................................... 296/167; 410/73; 410/76; 410/82
[58] Field of Search .................... 296/167; 410/68, 71, 410/72, 73, 76, 81, 82, 83

[56] References Cited

U.S. PATENT DOCUMENTS

| | | | |
|---|---|---|---|
| 3,331,333 | 7/1967 | Coulson | 410/81 |
| 3,419,242 | 12/1968 | Gossett | 296/167 |
| 3,450,066 | 6/1969 | Kasprzycki | 410/68 |
| 3,584,824 | 6/1971 | Belcer | 410/82 |

Primary Examiner—Robert R. Song
Attorney, Agent, or Firm—Carver & Co.

[57] ABSTRACT

An apparatus for locating a camper on a pick-up truck bed comprises a pair of members securable to the truck bed and the camper. A first member has an opening for receiving a portion of a second member as the camper is lowered towards the bed. The opening is substantially larger than the portion of the second member so that the second member is readily locatable within the opening. The members have a tapering fit therebetween and fit closely together when the camper is lowered onto the truck bed so the camper is properly located thereon.

2 Claims, 4 Drawing Figures

PICK-UP CAMPER LOCATING AND HOLDDOWN ASSEMBLY

BACKGROUND OF THE INVENTION

This invention relates to an apparatus for locating a camper on a pick-up truck bed.

Camper bodies fitted onto beds of pick-up trucks are extremely popular forms of recreational vehicles because the campers can be removed easily from the bed when required so the truck can be used for other purposes. When removed from the truck bed, the camper is normally supported on jacks near its four corners. The camper is fitted onto the truck bed by first backing the truck under the camper so supported. The jacks are then lowered until the camper rests on the truck bed. A holddown mechanism of some form is provided to anchor the camper onto the truck bed. It is clear that the camper must be very accurately aligned with the truck bed before it is lowered so that it will be in the proper position before being anchored. In the past this has required very skillfull backing of the truck and considerable trial and error.

A variety of different holddown devices for campers and the like are found in earlier U.S. patents. For example, U.S. Pat. No. 3,475,049 to Overhulser reveals a mounting means for camper pick-ups and shows a wedge-shaped piece 60 which fits into a receeding slot 50. Other types of camper anchoring devices are shown in U.S. Pat. No. 3,503,647 to Gostomski; No. 3,638,895 to Henson; No. 3,549,194 to Matson and No. 3,781,057 to Manuel. An easily assembled and disassembled camper is shown in U.S. Pat. No. 3,536,352 to Beckley, while U.S. Pat. 3,623,690 to Bargman shows a releasable holddown device adapted for insertion into the openings in stake pockets on a vehicle bed. These prior art patents do not reveal a holddown device which guides the camper precisely to the correct location on the truck bed as it is lowered onto the bed.

SUMMARY OF THE INVENTION

An apparatus for locating a camper on a pick-up truck bed comprises a pair of members securable to the truck bed and the camper. A first member has an opening for receiving a portion of a second member as the camper is lowered towards the bed. The opening is substantially larger than the portion of the second member so that the second member is readily locatable within the opening. The members have a tapering fit therebetween and fit tightly together with the camper is lowered onto the truck bed so the camper is properly located thereon.

The portion of the second member may comprise a pointed outer end of a projection. The first member may, for example, have a plate which is horizontal when a first member is secured in position, the opening comprising an aperture in the plate.

Preferably, where the camper and the truck bed have four corners, the camper has vertical side walls which fit within the truck bed and the truck bed has a flat bottom, the apparatus comprises four pairs of members. Each pair is securable to the camper and the truck bed near one of the corners. Each first member comprises a mounting plate securable to one of the side walls of the camper and an apertured plate extending perpendicularly therefrom and having the opening. The apertured plate is horizontal when the mounting plate is secured to the one side wall. Each second member comprises a base plate securable to the bottom of the truck bed and a projection from the base plate which has a pointed end which is upper when the base plate is secured to the truck bed. The projection of the second member comprises the pointed end. The projection has an inner end adjacent to the base plate. The inner end and the opening of the first member have generally the same cross-sectional extents.

Preferably, there is a locking device for engaging each pair of members when the camper is on the truck bed. The locking device comprises a slot in the projection, a shaft pivotally connected to the first member, a latch on the shaft engagable with the slot when the inner end of the projection is adjacent the apertured plate, a crank arm on the shaft for rotating the shaft, levers pivotally connected to the camper on each side thereof generally midway between the corners, and four rods each pivotally connected near one end to one of the crak arms and pivotally connected near another end to one of the levers. The locking devices can be engaged or disengaged when the levers are pivoted.

The present invention offers significant advantages for the owner of a camper adapted to fit on a pick-up truck bed. When the camper is being fitted to the truck bed, it is necessary only to position the truck in approximately the correct position under the camper where the opening of the first member is in vertical alignment with the portion of the second member. Since the opening is substantially larger than the portion of the second member, this is relatively easy. The camper is then lowered by means of the jacks and the tapering fit between the pair of members assures that the camper is properly positioned once it reaches the truck bed. The entire operation is therefore simplified and becomes a one man operation if necessary.

DESCRIPTION OF THE PREFERRED EMBODIMENTS

Figure 3:
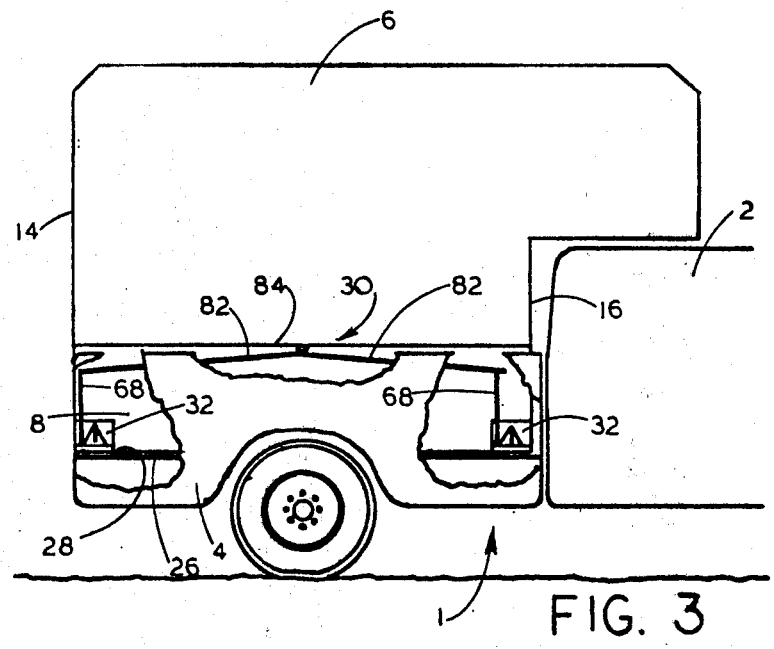
FIG. 3 is a side elevational view, partly broken away, of a combination truck, camper and an apparatus for locating the camper on the pick-up truck bed according to an embodiment of the invention.
Figure 4:
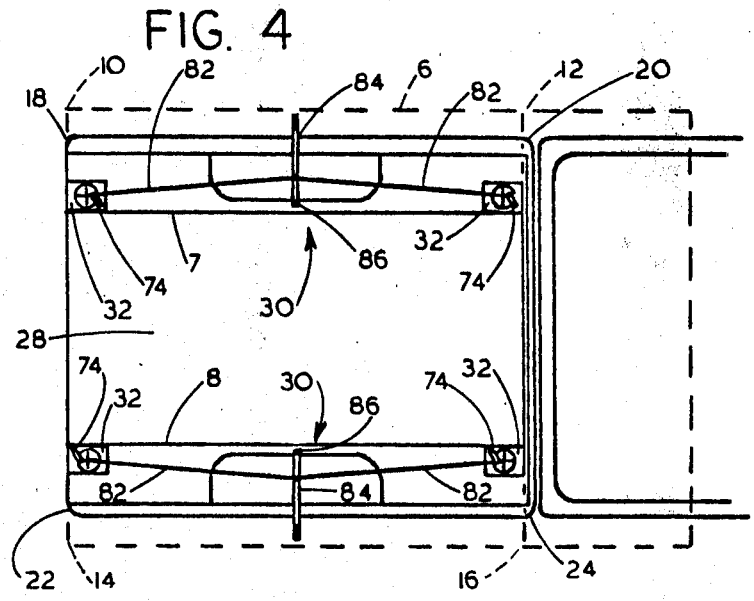
FIG. 4 is a top plan view of the combination of FIG. 3 with the camper shown in broken lines.

FIGS. 3 and 4 illustrate a typical pick-up truck 1 including a cab 2 and a truck bed 4. The truck 1 is fitted with a commonly known type of camper 6 fitted to the bed 4. The lower portion of the camper has a pair of vertical side walls 7 and 8 which fit within the truck bed. The four corners 10, 12, 14 and 16 of the campers are adjacent the four corners 18, 20, 22 and 24 of the truck bed. When the camper 6 is within the truck bed, its flat bottom 26 rests upon the flat bottom 28 of the truck bed.

The camper and pick-up truck bed are fitted with an apparatus 30 for locating the camper as it is lowered onto the truck bed. The apparatus 30 has four identical pairs of members 32 securable to the truck bed and the camper near the four corners thereof. One of the pairs of members is shown in better detail in FIG. 1. A first member 34 of the pair is constructed of a suitable material, such as steel plate, and welded connections are preferably used. The rectangular plate 36 is used as a mount to secure member 34 to the side wall 7 or 8 of the camper. This may be accomplished by inserting bolts through apertures in the walls of the camper and apertures 38 in the mount 36.

Another rectangular plate 40 extends perpendicularly from the bottom of mount 36 so as to be horizontal when member 34 is secured in position. The plate 40 has a large circular aperture 42 extending therethrough. Triangular side plates 44 and 46 and a short front plate 48 reinforce the connection between mount 36 and plate 40 and completes the box-like construction of member 34.

Figure 2:
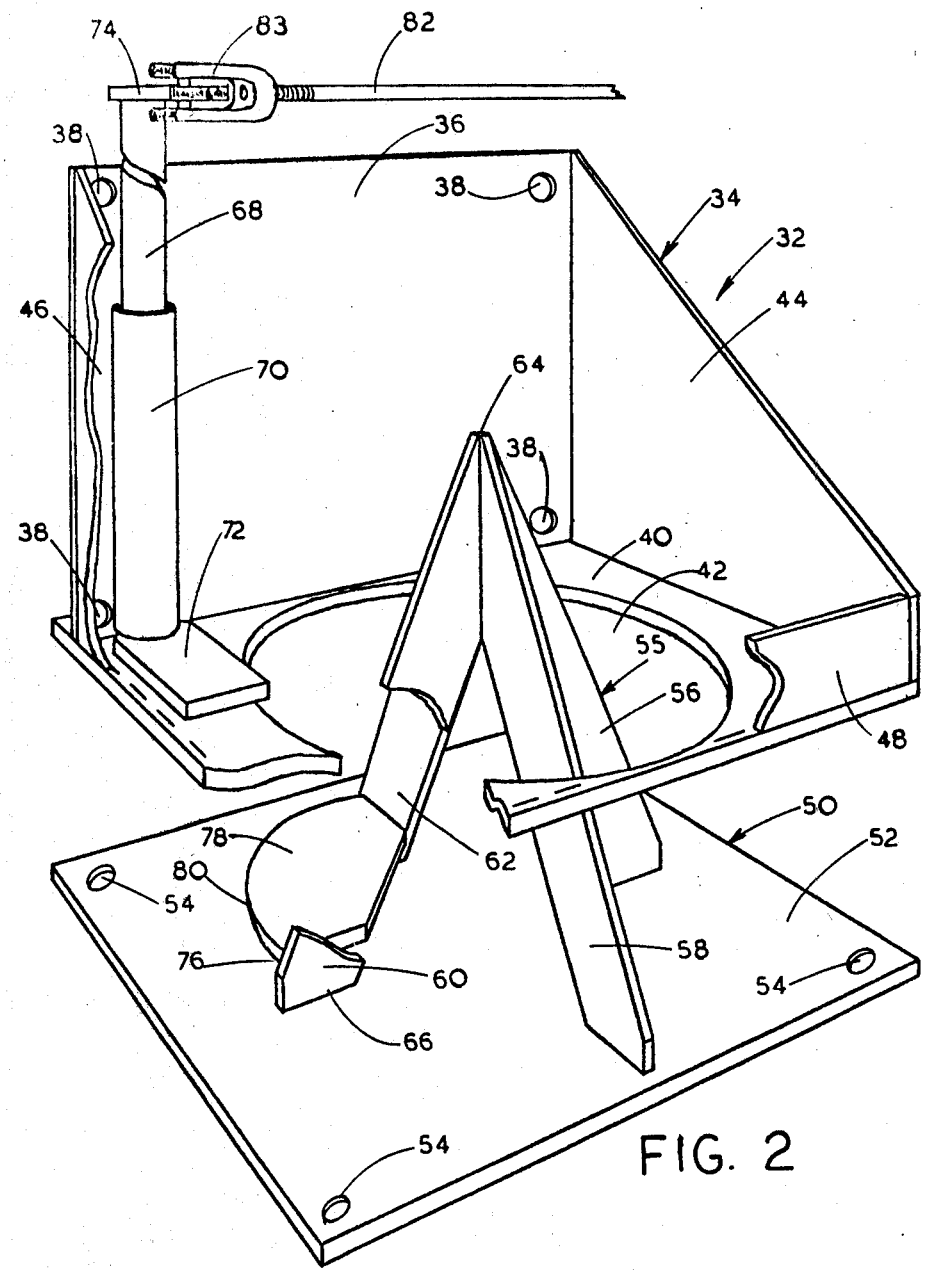
FIG. 2 is a perspective view of the members equivalent to FIG. 1, shown in a position when the camper is partly lowered onto the truck bed.

The second member 50 of the pair 32 is also preferably constructed of welded steel plate. Referring to FIG. 2, member 50 has a rectangular base plate 52 for securing the member to the flat bottom 28 of the truck bed, shown in FIG. 4. For this purpose, plate 52 is provided with a plurality of apertures 54 and, again, nuts and bolts are used to secure the plate to the bed in a horizontal position.

Figure 1:
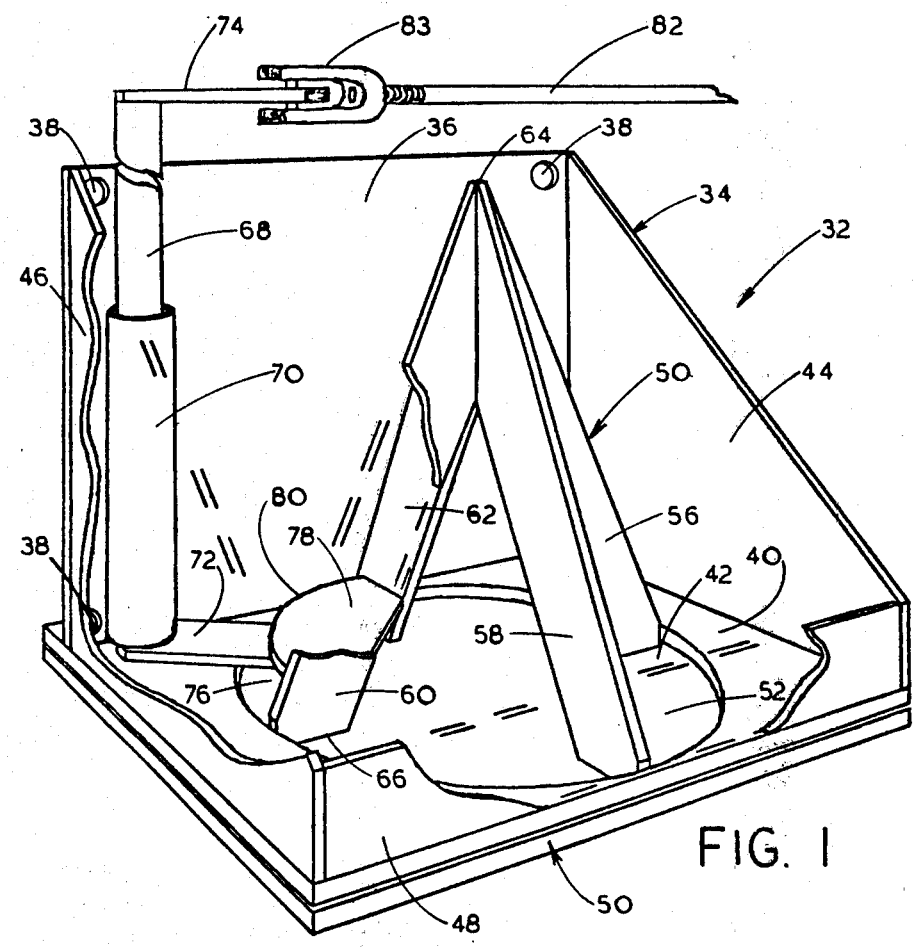
FIG. 1 is a perspective view, partly broken away, of two members of an apparatus for locating a camper on a pick-up truck bed, the members being fitted together in the position when the camper is resting on the bed.

Member 50 is provided with an upwardly pointed projection 55 formed from four substantially rectangular bars 56, 58, 60 and 62 which extend at an angle from the base plate 52 to the top pointed end 64. As may be seen, the projection 55 has a profile in the shape of an isosceles triangle having a base at the inner or bottom end 66 of the projection and tapering towards its vertex at the outer or top end 64 of the projection. The cross-sectional extent of projection 54 at its lower or inner end 66 is just slightly less than the cross-sectional extent or diameter of aperture 42 of member 34. This means that projection 54 of member 50 fits tightly within aperture 42 of member 34 when the members are brought together, as seen in FIG. 1.

There is a locking device for engaging the members 34 and 50 when the camper is on the truck bed. The locking device includes a shaft 68 which is vertical when member 34 is secured in position. Shaft 68 is pivotally fitted within the slightly larger tube 70 connected to mount 36 by welding or other suitable means. A latch 72 comprising a short rectangular bar is connected to the bottom end of shaft 68, while a crank arm 74 comprising another short rectangular bar is connected to the shaft 68 at its top end above latch 72.

A horizontal slot 76 is formed at the inner end 66 of projection 54 by means of the horizontal plate 78 extending between the bars 60 and 62. The outer edge 80 of plate 78 is in the shape of a circular curve. Employing crank arm 74, shaft 68 can be pivoted so latch 72 is engaged within slot 76 of projection 54, as seen in FIG. 1, or pivoted to a position where it would be disengaged from the slot, as seen in FIG. 2.

Since the crank arms 74 are located between the camper and the truck bed, and not readily accessible, four rods 82 connect the crank arms of the four members 34 to the levers 84 on each side of the camper. The levers 84 are each pivotally connected to the camper at 86. The rods 82 are pivotally connected at one end to one of the crank arms 74 by suitable means such as clevis 83 shown in FIGS. 1 and 2. Similar means is used to pivotally connect the other end to one of the levers 84.

Referring to FIG. 4, levers 84 are shown in the position where latches 72 are engaged with slots 76 of the projections 54. The latches can be disengaged from the slot simply by moving the levers.

In normal use, the four members 34 are secured permanently to the side walls 7 and 8 of the camper near the four corners thereof, as seen in FIG. 4. The levers 84 are connected to the camper and the rods 82 are fitted therebetween. The members 50 are secured to the bottom 28 of the truck bed so that the projections 54 are centered directly below the apertures 42 when the camper is positioned properly over the truck bed. One of the advantages of the invention is that it is not necessary to have the camper exactly positioned above the proper location on the truck bed before it is lowered, provided a portion of each of the projections 54, namely the pointed ends 64, are below the corresponding apertures 42 of the members 34. Because the apertures 42 are substantially larger than the pointed ends 64, a considerable degree of misalignment is permissable as long as each of the pointed ends 64 is below the proper aperture 42. The conventional jacks (not shown) upon which the camper is supported are then lowered until the projections 54 enter the apertures 42, as seen in FIG. 2. The tapering fit provided by the projection 54 and the aperture 42 of each of the members 50 and 34 means that the camper will be guided to exactly the right position on the truck bed. The sloping sides of each of the projections 54 contact the edges of the apertures 42 as the camper is lowered until the plate 40 of each of the first members 34 contacts the base plate 52 of each of the members 50. At this point, there is a close fit between the aperture 42 and the lower end 66 of each of the pairs of members. By pivoting the levers 84, the latches 72 are engaged with the slots 76 of each of the projections and the camper is held down on the truck bed at the proper location. The camper can be removed simply by pivoting the levers 84 again to disengage the latches 72 and then raising the camper on the conventional jacks.

What is claimed is:

1. An apparatus for locating a camper on a pick-up truck bed, the camper and the truck bed having four corners, the camper having vertical side walls which fit within the truck bed and the truck bed having a flat bottom, the apparatus comprising:

four pairs of first and second members, each said pair being securable to the camper and the truck bed near one of the corners, each said first member comprising a mounting plate securable to one of the side walls of the camper and an apertured plate extending perpendicularly therefrom having an opening, the apertured plate being horizontal when the mounting plate is secured to the one side wall, each said second member comprising a base plate securable to the bottom of the truck bed and a projection from the base plate having a pointed end which is upper when the base plate is secured to the truck bed, the projection having an inner end adjacent the base plate, the inner end and the opening of the first member having generally the same cross-sectional extents so the first and second members of each said pair of members fit closely together when the camper is lowered onto the truck bed and the camper is properly located thereon; and a locking device for engaging each said pair of members when the camper is on the truck bed, the locking device comprising a slot in the projection, a shaft pivotly connected to the first member, a latch on the shaft engagable with the slot when the inner end of the projection is adjacent said apertured plate, a crank arm on the shaft for rotating the shaft, levers pivotly connected to the camper on each side thereof generally midway between the corners, and four rods each pivotly connected near one end to one said crank arm and pivotly connected near another end to one said lever so the locking devices can be engaged or disengaged when the levers are pivoted.

2. In a combination of a truck with a bed and a camper removably received within the bed, the camper and bed having four generally adjacent corners, the improvement comprising an apparatus for properly locating the camper as the camper is lowered onto the bed, the apparatus comprising:

four pairs of members, each said pair being near one said corner and a first member of each pair being secured to the camper and having a downwardly facing opening, a second member of each said pair being secured to the bed and having an upwardly pointed, tapering projection extendable through the opening of the first member, the projection having a lower end, the lower end and the opening having generally the same cross-sectional extent so the pointed projections enter the openings when the camper is lowered onto the truck bed and the camper is properly positioned when the lower ends are adjacent the openings; and locking devices for engaging each of the pairs of members when the camper is on the truck bed, each said locking device comprising a horizontal slot in the projection adjacent the lower end, a vertical shaft pivotly connected to the first member, a latch on the shaft engagable with the shaft when the inner end of the projection is adjacent the opening, a crank arm near an end of the shaft above the latch, a lever pivotally mounted on each side of the camper, and four rods each pivotally connected to one of the crank arms at one end and pivotally connected to one of the levers at an end opposite the one end so the latches engage or disengage the projection when the levers are pivoted.

* * * * *